(12) United States Patent
Skinlo

(10) Patent No.: US 7,378,181 B2
(45) Date of Patent: May 27, 2008

(54) ELECTRIC STORAGE BATTERY CONSTRUCTION AND METHOD OF MANUFACTURE

(75) Inventor: David M. Skinlo, Valencia, CA (US)

(73) Assignee: Quallion LLC, Sylmar, CA (US)

( * ) Notice: Subject to any disclaimer, the term of this patent is extended or adjusted under 35 U.S.C. 154(b) by 723 days.

(21) Appl. No.: 10/666,379

(22) Filed: Sep. 17, 2003

(65) Prior Publication Data

US 2004/0048148 A1    Mar. 11, 2004

Related U.S. Application Data

(62) Division of application No. 10/167,688, filed on Jun. 12, 2002, now Pat. No. 6,670,071.

(60) Provisional application No. 60/348,665, filed on Jan. 15, 2002.

(51) Int. Cl.
*H01M 6/00*    (2006.01)
*H01M 2/26*    (2006.01)
*H01M 2/06*    (2006.01)
*H01M 2/10*    (2006.01)

(52) U.S. Cl. .................. 429/94; 429/161; 429/175; 429/186

(58) Field of Classification Search .................. 429/94, 429/186, 161, 176, 175
See application file for complete search history.

(56) References Cited

U.S. PATENT DOCUMENTS

| | | | |
|---|---|---|---|
| 701,917 A | 6/1902 | Morrison | |
| 2,463,565 A | 3/1949 | Ruben | |
| 2,562,215 A | 7/1951 | Ruben | |

(Continued)

FOREIGN PATENT DOCUMENTS

CA    480611    1/1952

(Continued)

OTHER PUBLICATIONS

Factory completed from 3E Labs web page; www.3elabs.com/pages/ft_c2.html; 1 page.

(Continued)

*Primary Examiner*—Patrick Joseph Ryan
*Assistant Examiner*—Thomas H. Parsons
(74) *Attorney, Agent, or Firm*—Gavrilovich Dodd & Lindsey, LLP

(57) ABSTRACT

An electric storage battery and method of manufacture thereof characterized by a feedthrough pin which is internally directly physically and electrically connected to an inner end of a positive electrode substrate. A C-shaped mandrel extends around the pin and substrate end enabling the pin/mandrel to be used during the manufacturing process as an arbor to facilitate winding layers of a spiral jellyroll electrode assembly. The pin additionally extends from the battery case and in the final product constitutes one of the battery terminals with the battery case comprising the other terminal. Active material is removed from both sides of the outer end of the negative electrode in the jellyroll to allow room for adhesive tape to secure the jellyroll. The electrolyte is injected through the open end of the case after the endcap is welded to the negative electrode but before sealing the endcap to the case. The electrolyte is preferably injected through the C-shaped mandrel to facilitate and speed filling.

29 Claims, 11 Drawing Sheets

U.S. PATENT DOCUMENTS

| | | |
|---|---|---|
| 3,245,837 A | 4/1966 | Ikeda et al. |
| 3,373,060 A | 3/1968 | Gray |
| 3,510,353 A | 5/1970 | McHenry |
| 3,536,532 A | 10/1970 | Watanabe et al. |
| 3,700,502 A | 10/1972 | Watanabe et al. |
| 3,775,182 A | 11/1973 | Patton et al. |
| 4,009,056 A | 2/1977 | Megahed et al. |
| 4,052,537 A | 10/1977 | Mallory |
| 4,053,687 A | 10/1977 | Coibion et al. |
| 4,053,692 A | 10/1977 | Dey |
| 4,056,885 A | 11/1977 | Rao |
| 4,091,188 A | 5/1978 | Dey |
| 4,105,833 A | 8/1978 | Greatbatch et al. |
| 4,121,020 A | 10/1978 | Epstein et al. |
| 4,226,920 A | 10/1980 | Armstrong |
| 4,247,608 A | 1/1981 | Watanabe et al. |
| 4,259,416 A | 3/1981 | Ikeda et al. |
| 4,268,587 A | 5/1981 | Farrington et al. |
| 4,271,242 A | 6/1981 | Toyoguchi et al. |
| 4,352,867 A | 10/1982 | Catanzarite |
| 4,385,101 A | 5/1983 | Catanzarite |
| 4,386,137 A | 5/1983 | Watanabe et al. |
| 4,391,729 A | 7/1983 | Liang et al. |
| 4,476,624 A | 10/1984 | Klein et al. |
| 4,502,903 A | 3/1985 | Bruder |
| 4,539,272 A | 9/1985 | Goebel |
| 4,539,274 A | 9/1985 | Goebel |
| 4,565,752 A | 1/1986 | Goebel et al. |
| 4,565,753 A | 1/1986 | Goebel et al. |
| 4,604,333 A | 8/1986 | Ikeda et al. |
| 4,767,682 A | 8/1988 | Dorogi et al. |
| 4,802,275 A | 2/1989 | Freluche |
| 4,822,377 A | 4/1989 | Wolff |
| 4,879,190 A | 11/1989 | Lundsgaard |
| 4,929,519 A | 5/1990 | Catotti |
| 4,942,101 A | 7/1990 | Audebert et al. |
| 4,966,822 A | 10/1990 | Johnston |
| 5,008,161 A | 4/1991 | Johnston |
| 5,008,165 A | 4/1991 | Schmöde |
| 5,017,442 A | 5/1991 | Watanabe et al. |
| 5,021,306 A | 6/1991 | Sauer et al. |
| 5,047,068 A | 9/1991 | Stoklosa |
| 5,114,811 A | 5/1992 | Ebel et al. |
| 5,116,698 A | 5/1992 | Sears |
| 5,147,737 A | 9/1992 | Post et al. |
| 5,306,581 A | 4/1994 | Taylor et al. |
| 5,344,724 A | 9/1994 | Ozaki et al. |
| 5,360,678 A | 11/1994 | Spillman et al. |
| 5,422,201 A | 6/1995 | Georgopoulos |
| 5,423,110 A | 6/1995 | Gauthier et al. |
| 5,501,916 A * | 3/1996 | Teramoto et al. ............ 429/94 |
| 5,514,492 A | 5/1996 | Marincic et al. |
| 5,543,249 A | 8/1996 | Takeuchi et al. |
| 5,558,962 A | 9/1996 | Marincic et al. |
| 5,571,632 A | 11/1996 | Teramoto |
| 5,584,893 A | 12/1996 | Mitchell |
| 5,597,658 A | 1/1997 | Kejha |
| 5,667,912 A | 9/1997 | Georgopoulos |
| 5,736,270 A | 4/1998 | Suzuki et al. |
| 5,755,759 A * | 5/1998 | Cogan ................ 607/116 |
| 5,795,680 A | 8/1998 | Ikeda et al. |
| 5,804,327 A | 9/1998 | Oltman |
| 5,821,011 A | 10/1998 | Taylor et al. |
| 5,882,815 A | 3/1999 | Tagawa |
| 5,891,593 A | 4/1999 | Keller et al. |
| 5,900,720 A | 5/1999 | Kallman et al. |
| 5,912,089 A | 6/1999 | Kitano et al. |
| 5,925,482 A | 7/1999 | Yamashita |
| 5,948,563 A | 9/1999 | Kawase et al. |
| 5,965,291 A | 10/1999 | Pyszczed |
| 5,989,751 A | 11/1999 | Cotte et al. |
| 6,007,938 A | 12/1999 | Blancheton |
| 6,020,084 A | 2/2000 | Romero et al. |
| 6,030,422 A | 2/2000 | Pyszczek |
| 6,033,795 A | 3/2000 | Broussely et al. |
| 6,042,957 A | 3/2000 | Oltman |
| 6,057,060 A | 5/2000 | Yu |
| 6,090,503 A | 7/2000 | Taylor et al. |
| 6,114,059 A | 9/2000 | Watanabe et al. |
| 6,132,898 A | 10/2000 | Kawamura |
| 6,165,641 A | 12/2000 | Striebel et al. |
| 6,180,285 B1 | 1/2001 | Yoshida et al. |
| 6,190,803 B1 | 2/2001 | Tomiyama et al. |
| 6,225,007 B1 | 5/2001 | Horne et al. |
| 6,228,536 B1 | 5/2001 | Wasynczuk |
| 6,242,129 B1 | 6/2001 | Johnson |
| 6,245,452 B1 | 6/2001 | Oltman |
| 6,265,099 B1 | 7/2001 | Gauthier et al. |
| 6,265,100 B1 | 7/2001 | Saaski et al. |
| 6,308,101 B1 | 10/2001 | Faltys et al. |
| 6,319,627 B1 | 11/2001 | Snyder et al. |
| 6,325,611 B1 | 12/2001 | Iwasaki et al. |
| 6,348,282 B1 | 2/2002 | Okochi et al. |
| 6,379,403 B1 | 4/2002 | Fukumura et al. |
| 6,379,839 B1 | 4/2002 | Inoue et al. |
| 6,387,561 B1 | 5/2002 | Nemoto et al. |
| 6,399,242 B2 * | 6/2002 | Kitoh et al. ................ 429/164 |
| 6,410,187 B1 | 6/2002 | Luo et al. |
| 6,410,189 B1 | 6/2002 | Yamada et al. |
| 6,432,574 B1 | 8/2002 | Suzuki et al. |
| 6,451,483 B1 | 9/2002 | Probst et al. |
| 6,458,490 B1 | 10/2002 | Hommura et al. |
| 6,503,646 B1 | 1/2003 | Ghantous et al. |
| 6,503,657 B1 | 1/2003 | Takami et al. |
| 6,506,514 B1 | 1/2003 | Endo et al. |
| 6,576,365 B1 | 6/2003 | Meitav et al. |
| 6,641,953 B2 | 11/2003 | Takeuchi et al. |
| 6,667,132 B2 | 12/2003 | Okochi et al. |
| 6,677,076 B2 * | 1/2004 | Nakahara et al. ............. 429/94 |
| 6,727,022 B2 | 4/2004 | Gan et al. |
| 7,066,971 B1 | 6/2006 | Carlson |
| 2001/0031398 A1 | 10/2001 | Hashimoto et al. |
| 2001/0033972 A1 | 10/2001 | Kawai et al. |
| 2001/0044047 A1 | 11/2001 | Gan et al. |
| 2001/0049054 A1 | 12/2001 | Enomoto et al. |
| 2002/0004161 A1 | 1/2002 | Yamaguchi |
| 2002/0076605 A1 | 6/2002 | Akashi et al. |
| 2002/0146626 A1 | 10/2002 | Komatsu et al. |
| 2002/0187399 A1 | 12/2002 | Johnson et al. |
| 2003/0022062 A1 | 1/2003 | Wutz et al. |
| 2003/0089889 A1 | 5/2003 | Park et al. |
| 2003/0104282 A1 | 6/2003 | Xing et al. |
| 2003/0113628 A1 | 6/2003 | Paulot et al. |
| 2003/0134188 A1 | 7/2003 | Roy et al. |
| 2003/0134191 A1 | 7/2003 | Buckle et al. |
| 2003/0138697 A1 | 7/2003 | Leising et al. |
| 2003/0198868 A1 | 10/2003 | Takeuchi et al. |
| 2004/0018421 A1 | 1/2004 | LaFollette et al. |
| 2004/0029005 A1 | 2/2004 | Leising et al. |
| 2004/0049908 A1 | 3/2004 | Tsukamoto et al. |
| 2004/0053115 A1 | 3/2004 | Skinlo |
| 2004/0053116 A1 | 3/2004 | Skinlo |
| 2004/0053117 A1 | 3/2004 | Tsukamoto et al. |
| 2004/0053118 A1 | 3/2004 | Tsukamoto et al. |
| 2004/0053119 A1 | 3/2004 | Tsukamoto et al. |
| 2004/0055146 A1 | 3/2004 | Tsukamoto et al. |
| 2004/0058236 A1 | 3/2004 | Tsukamoto et al. |
| 2006/0035147 A1 | 2/2006 | Lam et al. |

FOREIGN PATENT DOCUMENTS

| | | |
|---|---|---|
| EP | 0942484 B1 | 9/1999 |
| EP | 0942484 B1 | 5/2001 |
| EP | 01296389 A1 | 3/2003 |

| | | | |
|---|---|---|---|
| EP | 01331683 A2 | 7/2003 |
| EP | 1388905 A2 | 2/2004 |
| JP | 58-030073 A2 | 2/1983 |
| JP | 59-042783 A | 3/1984 |
| JP | 01151150 A | 6/1989 |
| JP | 3046772 A2 | 2/1991 |
| JP | 03-093156 A2 | 4/1991 |
| JP | 3222257 A2 | 10/1991 |
| JP | 4206366 A2 | 7/1992 |
| JP | 7249403 A2 | 9/1995 |
| JP | 9330707 A2 | 12/1997 |
| JP | 10289708 A2 | 10/1998 |
| JP | 11260372 A2 | 9/1999 |
| JP | 11-329444 | 11/1999 |
| JP | 2000036324 A | 9/2000 |
| JP | 2000348754 A2 | 12/2000 |
| WO | WO 02/078113 A1 | 10/2002 |
| WO | WO 03-061038 A1 | 7/2003 |
| WO | WO 03-061051 A1 | 7/2003 |
| WO | WO 03/096446 A1 | 11/2003 |

OTHER PUBLICATIONS

Three E Laboratories Inc. homepage; www.3elabs.com; 2 pages.
Swage Crimp by 3E Labs; Hernacrimp seal terminals and feed throughs; www.3elabs.com/pages/ft_c.html; 2 pages.
Japanese packaging from National for Battery, BR425/2B; 2 pages.
International Preliminary Examination Report, dated Nov. 28, 2003, received in relation to Application No. PCT/US03/01338.
A. Rawle, "Basic Principles of Particle Size Analysis," Malvern Instruments Limited, downloaded from http://www.malvern.co.uk/malvern/rw_malvern.nsf/vwa_docref/IWTM%20particle%20size, no date.
Table 14.4 Cathode Materials Used in Lithium Primary Batteries.
Unpublished International Application PCT/US03/21343, Applicant Quallion LLC, Inventors Lam et al., International Filing Date Jul. 9, 2003.
Preliminary Amendment filed in U.S. Appl. No. 10/666,873, Tsukamoto et al., filing date Sep. 17, 2003.
International Preliminary Examination Report, dated Oct. 30, 2003, received in relation to Application No. PCT/US03/01334.
Preliminary Amendment filed in U.S. Appl. No. 10/478,920, Lam et al., filing date Nov. 19, 2003.
Preliminary Amendment filed in U.S. Appl. No. 10/478,706, Nakahara et al., filing date Nov. 19, 2003.
Preliminary Amendment filed in U.S. Appl. No. 10/484,474, Tsukamoto et al., filing date Jan. 20, 2004.
International Search Report, dated Mar. 1, 2004, received in relation to Application No. PCT/US03/21343.

* cited by examiner

ELECTRIC STORAGE BATTERY CONSTRUCTION AND METHOD OF MANUFACTURE

CROSS-REFERENCE TO RELATED APPLICATIONS

This application is a Divisional of U.S. patent application Ser. No. 10/167,688, filed Jun. 12, 2002, now U.S. Pat. No. 6,670,071, which claims the benefit of U.S. Provisional Application No. 60/348,665, filed Jan. 15, 2002, each of which is incorporated herein by reference in its entirety.

FIELD OF THE INVENTION

This invention relates generally to electric storage batteries and more particularly to a battery construction, and method of manufacture thereof, suitable for use in implantable medical devices.

BACKGROUND OF THE INVENTION

Rechargeable electric storage batteries are commercially available in a wide range of sizes for use in a variety of applications. As battery technology continues to improve, batteries find new applications which impose increasingly stringent specifications relating to physical size and performance. Thus, new technologies have yielded smaller and lighter weight batteries having longer storage lives and higher energy output capabilities enabling them to be used in an increasing range of applications, including medical applications, where, for example, the battery can be used in a medical device which is implanted in a patient's body. Such medical devices can be used to monitor and/or treat various medical conditions.

Batteries for implantable medical devices are subject to very demanding requirements, including long useful life, high power output, low self-discharge rates, compact size, high reliability over a long time period, compatibility with the patient's internal body chemistry, etc. Although various battery chemistries have been tried, lithium ion technology is generally accepted as the preferred chemistry for medical implant applications.

Such electric storage batteries are generally comprised of a tubular metal case enveloping an interior cavity which contains an electrode assembly surrounded by a suitable electrolyte. The electrode assembly generally comprises a plurality of positive electrode, negative electrode, and separator layers which are typically stacked and/or spirally wound to form a jellyroll. The positive electrode is generally formed of a metal substrate having positive active material coated on both faces of the substrate. Similarly, the negative electrode is formed of a metal substrate having negative active material coated on both faces of the substrate. In forming an electrode assembly, separator layers are interleaved between the positive and negative electrode layers to provide electrical isolation.

SUMMARY OF THE INVENTION

The present invention is directed to an electric storage battery incorporating one or more aspects described herein for enhancing battery reliability while minimizing battery size. In addition, the invention is directed to a method for efficiently manufacturing the battery at a relatively low cost.

In accordance with a first significant aspect of the invention, a feedthrough pin is provided which is directly physically and electrically connected to the inner end of an electrode substrate (e.g., positive), as by welding. The pin is used during the manufacturing process as an arbor to facilitate winding the layers to form an electrode assembly jellyroll. Additionally, in the fully manufactured battery, the pin extends through a battery case endcap and functions as one of the battery terminals. The battery case itself generally functions as the other battery terminal.

More particularly, in accordance with an exemplary preferred embodiment, the inner end of the positive electrode substrate is spot welded to the feedthrough pin to form an electrical connection. The substrate, e.g., aluminum, can be very thin, e.g., 0.02 mm, making it difficult to form a strong mechanical connection to the pin, which is preferably constructed of a low electrical resistance, highly corrosion resistant material, e.g., platinum iridium, and can have a diameter on the order of 0.40 mm. In order to mechanically reinforce the pin and secure the pin/substrate connection, a slotted C-shaped mandrel is provided. The mandrel is formed of electrically conductive material, e.g., titanium-6Al-4V, and is fitted around the pin, overlaying the pin/substrate connection. The mandrel is then preferably welded to both the pin and substrate. The mandrel slot defines a keyway for accommodating a drive key which can be driven to rotate the mandrel and pin to wind the electrode assembly layers to form the spiral jellyroll.

In accordance with a further significant aspect of the invention, the outer layer of the jellyroll is particularly configured to minimize the size, i.e., outer radius dimension, of the jellyroll. More particularly, in the exemplary preferred embodiment, the active material is removed from both faces of the negative electrode substrate adjacent its outer end. The thickness of each active material coat can be about 0.04 mm and the thickness of the negative substrate can be about 0.005 mm. By baring the outer end of the negative electrode substrate, it can be adhered directly, e.g., by an appropriate adhesive tape, to the next inner layer to close the jellyroll to while minimizing the roll outer radius dimension.

A battery case in accordance with the invention is comprised of a tubular case body having open first and second ends. The feedthrough pin preferably carries a first endcap physically secured to, but electrically insulated from, the pin. This first endcap is preferably secured to the case body, as by laser welding, to close the open first end and form a leak free seal. With the jellyroll mounted in the case and the first endcap sealed, the interior cavity can thereafter be filled with electrolyte from the open second end.

In accordance with a still further aspect of the invention, the jellyroll assembly is formed with a flexible electrically conductive tab extending from the negative electrode substrate for electrical connection to the battery case. In accordance with a preferred embodiment, the tab is welded to a second endcap which is in turn welded to the case. The tab is sufficiently flexible to enable the second endcap to close the case body second end after the interior cavity is filled with electrolyte via the open second end. In accordance with an exemplary preferred embodiment, the tab is welded to the inner face of the second endcap such that when the jellyroll is placed in the body, the tab locates the second endcap proximate to the body without obstructing the open second end. After electrolyte filling, the case body is sealed by bending the tab to position the second endcap across the body second end and then laser welding the endcap to the case body.

DETAILED DESCRIPTION

Figure 1:
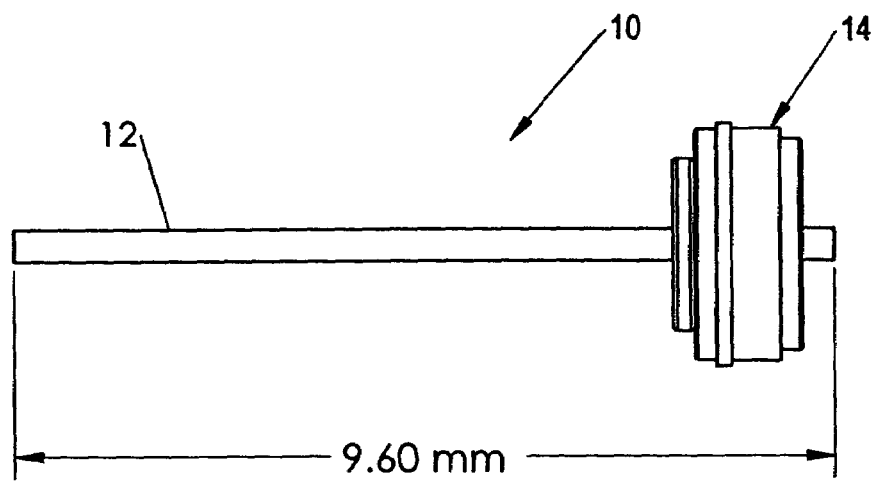
FIG. 1 is a side view of a feedthrough pin subassembly in accordance with the invention.
Figure 2:
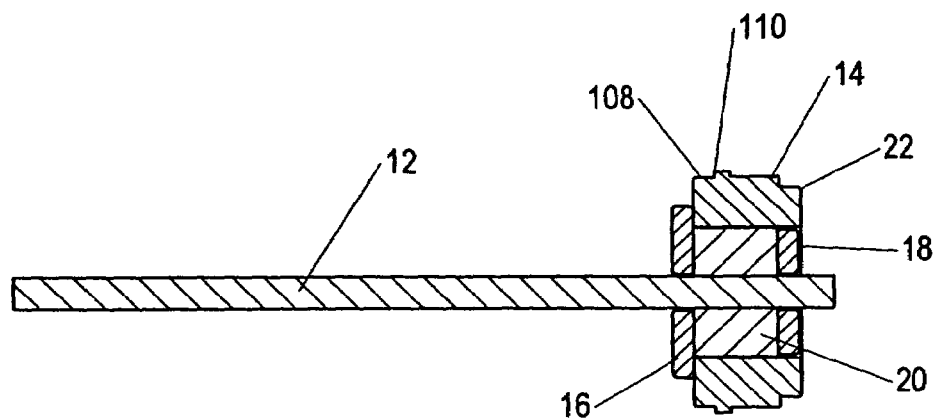
FIG. 2 is a longitudinal sectional view through the subassembly of FIG. 1.

Attention is initially directed to FIGS. 1 and 2 which illustrate a preferred feedthrough pin subassembly 10 utilized in accordance with the present invention. The subassembly 10 is comprised of an elongate pin 12, preferably formed of a solid electrically conductive material, having low electrical resistance and high corrosion resistance such as platinum iridium, preferably 90Pt/10Ir. The pin 12 extends through, and is hermetically sealed to a header 14. The header 14 is comprised of dielectric disks, e.g., ceramic, 16 and 18 which sandwich a glass hollow cylinder 20 therebetween. The glass hollow cylinder is hermetically sealed to the pin 12. The outer surface of the glass hollow cylinder 20 is sealed to the inner surface of an electrically conductive hollow member 22, e.g., titanium-6Al-4V. As will be seen hereinafter, the conductive hollow material 22 functions as a battery case endcap in the final product to be described hereinafter.

Figure 3:
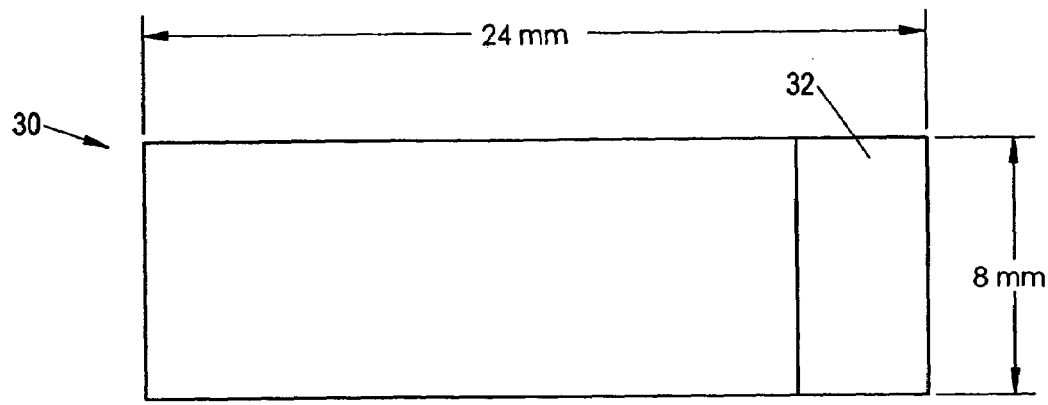
FIG. 3 is a plan view of a positive electrode strip utilized in the exemplary preferred electrode assembly in accordance with the invention.
Figure 4:
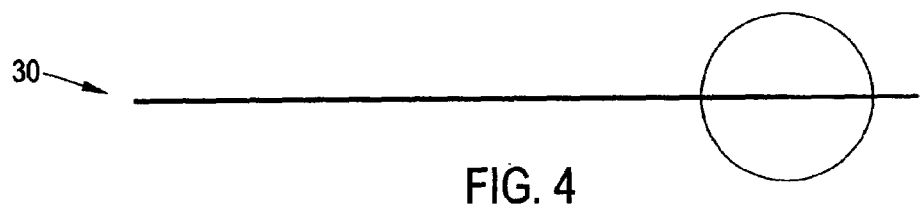
FIG. 4 is a side view of the positive electrode strip of FIG. 3.
Figure 5:
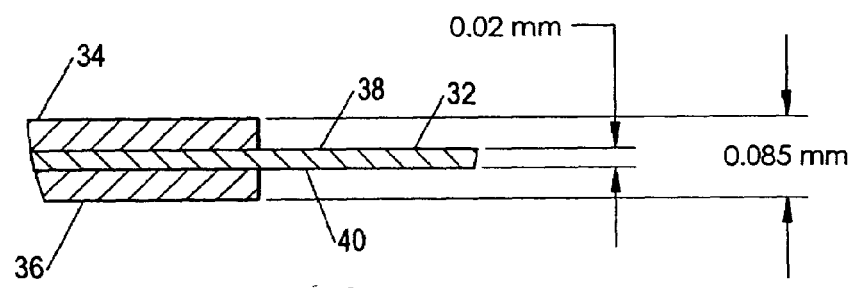
FIG. 5 is an enlarged sectional view of the area A of FIG. 4 showing the inner end of the positive electrode strip of FIGS. 3 and 4.

Attention is now directed to FIGS. 3, 4, and 5 which illustrate a preferred positive electrode strip 30 which is utilized in the fabrication of a preferred spirally wound jellyroll electrode assembly in accordance with the present invention. The positive electrode strip 30 is comprised of a metal substrate 32 formed, for example, of aluminum. Positive electrode active material 34, 36 is deposited, respectively on the upper and lower faces 38 and 40 of the substrate 32. Note in FIGS. 3, 4, and 5 that the right end of the substrate 32 is bare, i.e. devoid of positive active material on both the upper and lower faces 38, 40.

It is to be pointed out that exemplary dimensions are depicted in FIGS. 1-5 and other figures herein. These exemplary dimensions are provided primarily to convey an order of magnitude to the reader to facilitate an understanding of the text and drawings. Although the indicated dimensions accurately reflect one exemplary embodiment of the invention, it should be appreciated that the invention can be practiced utilizing components having significantly different dimensions.

Figure 6:
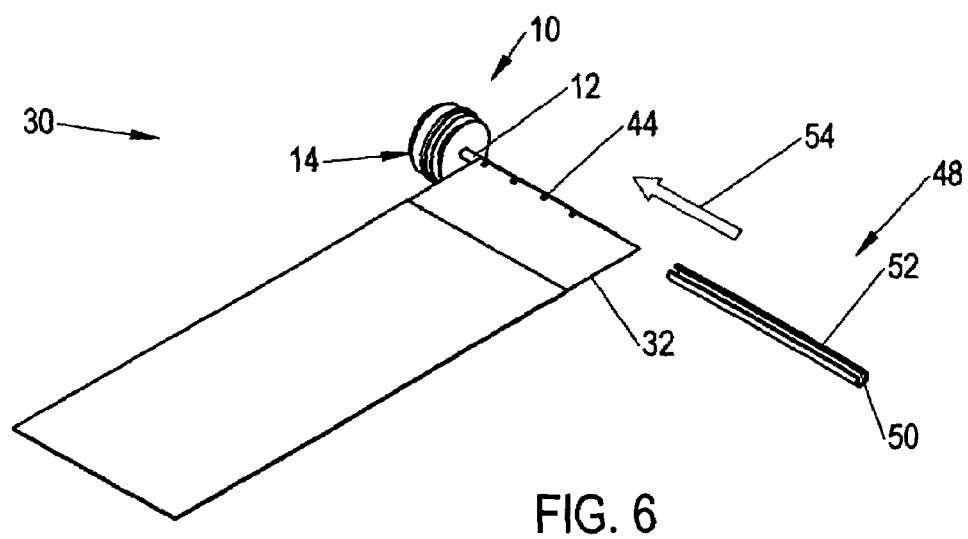
FIG. 6 is an isometric view showing the bared inner end of the positive electrode substrate spot welded to the feedthrough pin and configured to receive a C-shaped mandrel thereon.

FIG. 6 depicts an early process step for manufacturing a battery in accordance with the invention utilizing the pin subassembly 10 (FIGS. 1, 2) and the positive electrode strip 30 (FIGS. 3-5). A topside electrode insulator (not shown), which may comprise a thin disk of DuPont Kapton® polyimide film, is slipped onto the pin 12 adjacent the header 14. In accordance with the present invention, the bare end of the electrode strip substrate 32 is electrically connected to the pin 12 preferably by resistance spot welding, shown at 44. Alternatively, substrate 32 may be ultrasonically welded to the pin 12. The thinness, e.g. point 0.02 mm of the substrate 32, makes it very difficult to form a strong mechanical connection between the substrate and the pin 12. Accordingly, in accordance with a significant aspect of the present invention, an elongate C-shaped mandrel 48 is provided to mechanically reinforce the pin 12 and secure the substrate 32 thereto.

Figure 7:
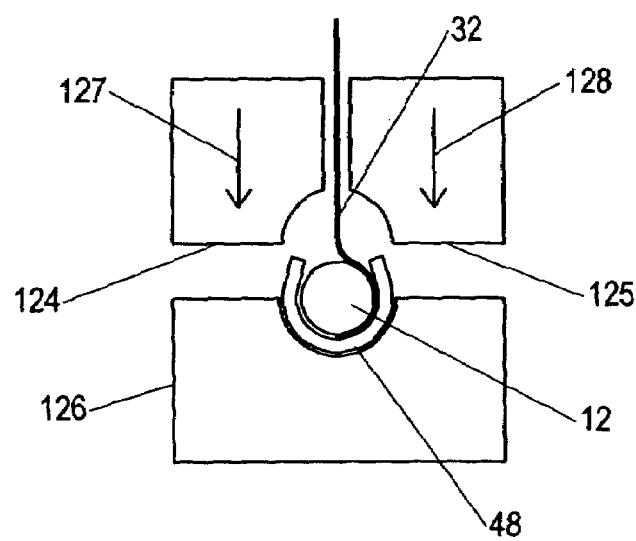
FIG. 7 is an end view showing the C-shaped mandrel being crimped to the pin and electrode.

The mandrel 48 preferably comprises an elongate titanium or titanium alloy such as Ti-6Al-4V tube 50 having a longitudinal slot 52 extending along the length thereof. The arrow 54 in FIG. 6 depicts how the mandrel 48 is slid over the pin 12 and substrate 32, preferably overlaying the line of spot welds 44. The mandrel 48, pin 12, and substrate 32 are then preferably welded together, such as by resistance spot welding or by ultrasonic welding. Alternatively, the mandrel 48 may be crimped onto the pin 12 at least partially closing the "C" to create a strong mechanical connection. In the case of forming only a mechanical connection and not necessarily a gas-tight electrical connection between the mandrel 48 and the pin and substrate, the mandrel material is preferably made of a material that will not lead to electrolysis. When used with electrolytes that tend to contain hydrofluoric acid, the mandrel is preferably made of 304, 314, or 316 stainless steels or aluminum or an alloy thereof chosen for its compatibility with the other materials. FIG. 7 is an end view showing the step of crimping the mandrel 48 to the pin 12 and substrate 32. Supporting die 126 is used to support the mandrel 48 and crimping dies 124 and 125 are used to deform the edges of the mandrel 48 to bring them closer together and mechanically connect the mandrel 48 to the pin 12 and substrate 32. By crimping in the direction of arrows 127 and 128, a strong connection is formed without damaging the thin electrode or disturbing the electrical connection between the pin and the electrode.

Figure 8:
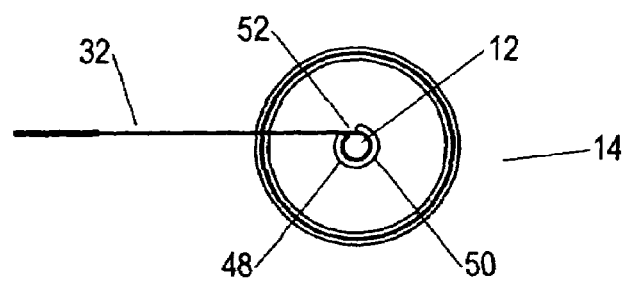
FIG. 8 is an end view showing the C-shaped mandrel mounted on the pin and capturing the positive electrode substrate therebetween.
Figure 9:
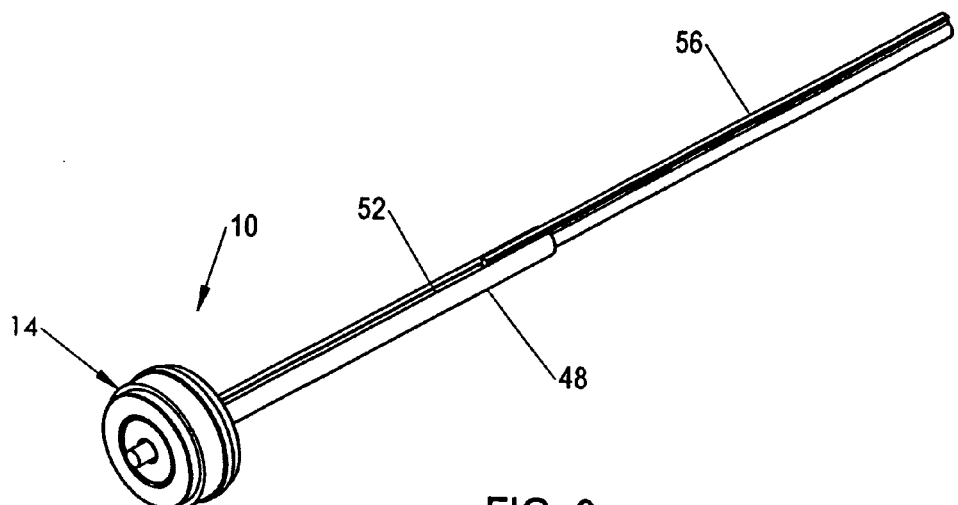
FIG. 9 is an isometric view depicting a drive key accommodated in the slot of the C-shaped mandrel.

FIG. 8 is an end view showing the slotted mandrel 48 on the pin 12 with the substrate 32 extending tangentially to the pin 12 and terminating adjacent the interior surface of the mandrel tube 50. The tube 50 is preferably sufficiently long so as to extend beyond the free end of the pin 12. As depicted in FIG. 9, this enables a drive key 56 to extend into the mandrel slot 52.

Figure 10:
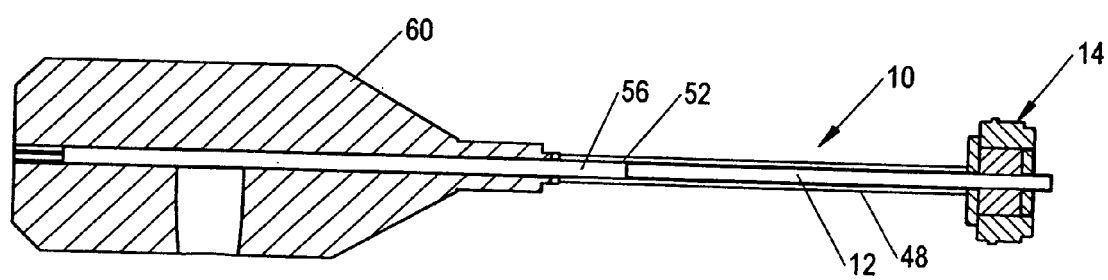
FIG. 10 is a plan view showing the drive key coupled to a drive motor for rotating the C-shaped mandrel.

FIG. 10 schematically depicts a drive motor 60 for driving the drive key 56 extending into mandrel slot 52. With the pin subassembly header 14 supported for rotation (not shown), energization of the motor 60 will orbit the key drive 56 to rotate the mandrel 48 and subassembly 10 around their common longitudinal axes. The rotation of the mandrel 48 and subassembly 10 is employed to form a jellyroll electrode assembly in accordance with the present invention.

Figure 11:
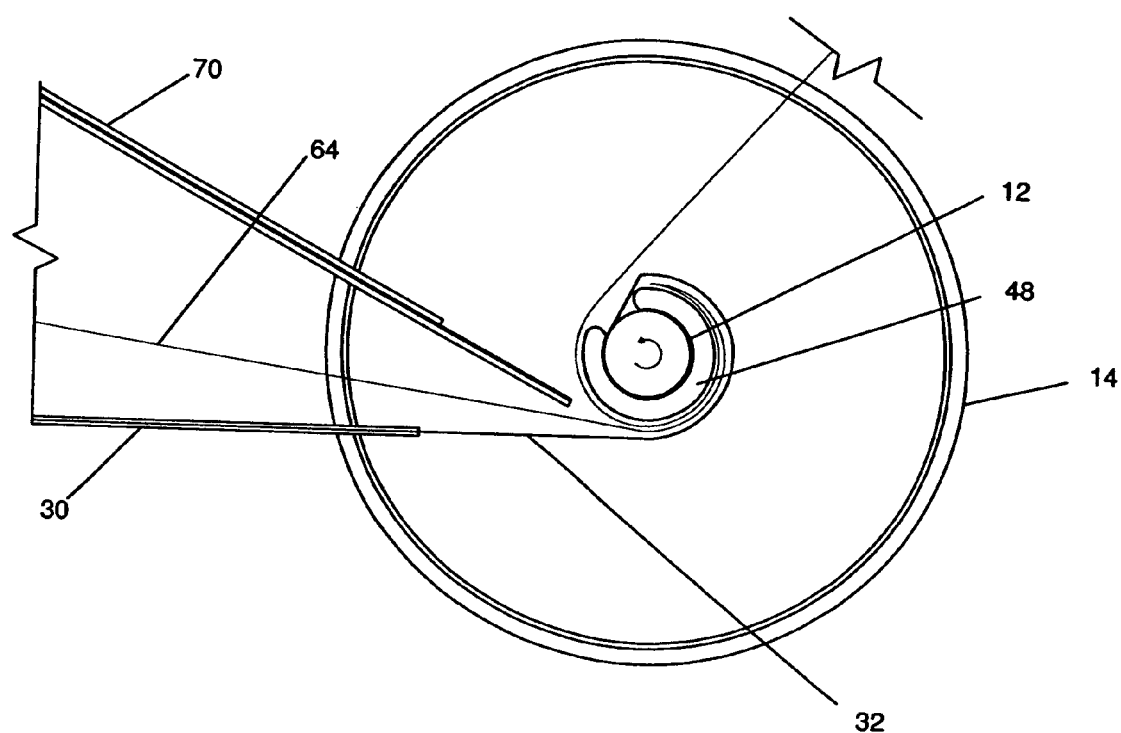
FIG. 11 is a schematic end view depicting how rotation of the C-shaped mandrel and pin can wind positive electrode, negative electrode, and separator strips to form a spiral jellyroll electrode assembly.
Figure 12:
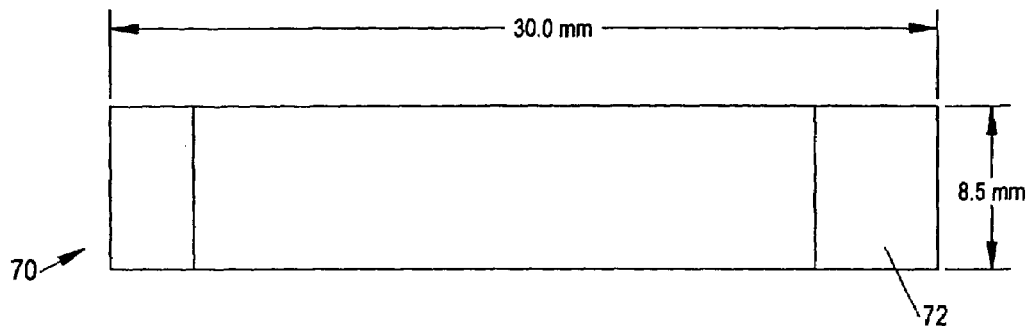
FIG. 12 is a plan view of a negative electrode strip utilized in the exemplary preferred electrode assembly in accordance with the invention.
Figure 13:
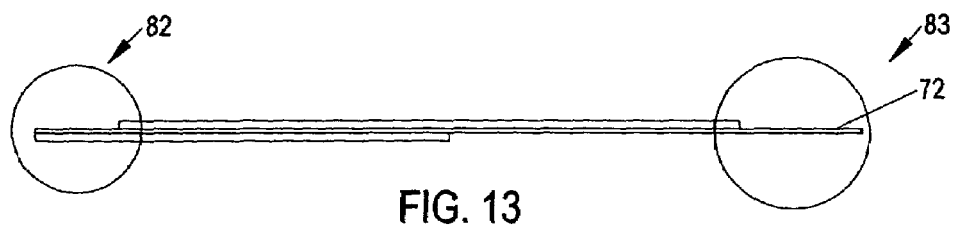
FIG. 13 is a side view of the negative electrode strip of FIG. 12.

More particularly, FIG. 11 depicts how a jellyroll electrode assembly is formed in accordance with the present invention. The bare end of the substrate 32 of the positive electrode strip 30 is electrically connected to the pin 12 as previously described. The conductive mandrel 48 contains the pin 12 and bare substrate end, being welded to both as previously described. A strip of insulating separator material 64 extending from opposite directions is introduced between the mandrel 48 and positive electrode substrate 32, as shown. A negative electrode strip 70 is then introduced between the portions of the separator material extending outwardly from mandrel 48.

Figure 14:
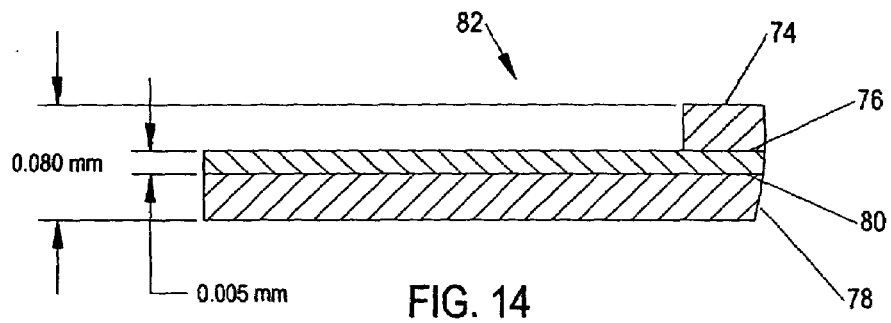
FIG. 14 is an enlarged sectional view of the area A of FIG. 13 showing the inner end of the negative electrode strip of FIGS. 12 and 13.
Figure 15:
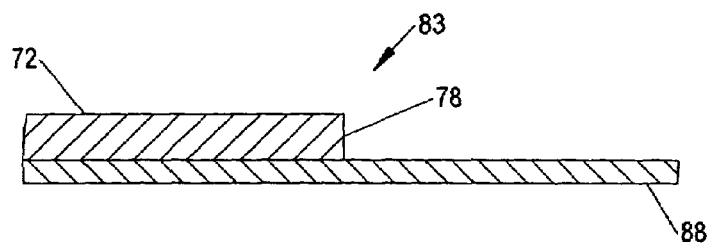
FIG. 15 is an enlarged sectional view of the area B of FIG. 13 showing the outer end of the negative electrode strip of FIGS. 11 and 12.

The preferred exemplary negative electrode strip 70 is depicted in FIGS. 12-15. The negative electrode strip 70 is comprised of a substrate 72, e.g. titanium, having negative active material formed on respective faces of the substrate. More particularly, note in FIG. 14 that negative active material 74 is deposited on the substrate upper surface 76 and negative active material 78 is deposited on the substrate lower surface 80. FIG. 14 depicts the preferred configuration of the inner end 82 of the negative electrode strip 70 shown at the left of FIGS. 12 and 13. FIG. 15 depicts the configuration of the outer end 83 of the negative electrode strip 70 shown at the right side of FIGS. 12 and 13.

Figure 16:
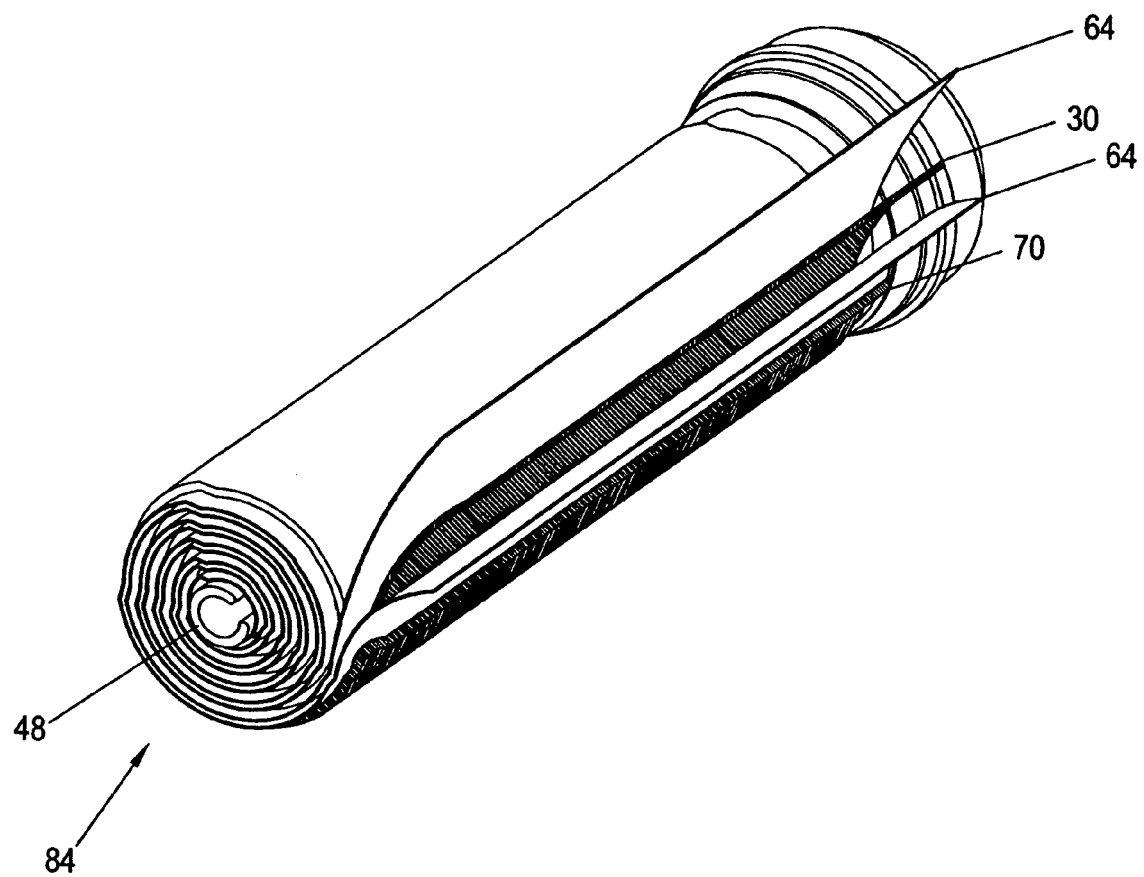
FIGS. 16A and 16B are isometric and cross sectional views, respectively, showing the layers of a spirally wound electrode assembly, i.e., jellyroll.

Note in FIG. 14 that one face of the substrate inner end 82 is bared. This configuration can also be noted in FIG. 11 which shows how the negative substrate inner end 82 is inserted between turns of the separator strip 64. After the strip 70 has been inserted as depicted in FIG. 11, the aforementioned drive motor 60 is energized to rotate pin 12 and mandrel 48, via drive key 56, in a counterclockwise direction, as viewed in FIG. 11. Rotation of pin 12 and mandrel 48 functions to wind positive electrode strip 30, separator strip 64, and negative electrode strip 70, into the spiral jellyroll assembly 84, depicted in FIG. 16A. The assembly 84 comprises multiple layers of strip material so that a cross section through the assembly 84 reveals a sequence of layers in the form pos/sep/neg/sep/pos/sep/neg/. . . , etc., as shown in FIG. 16B.

Figure 17:
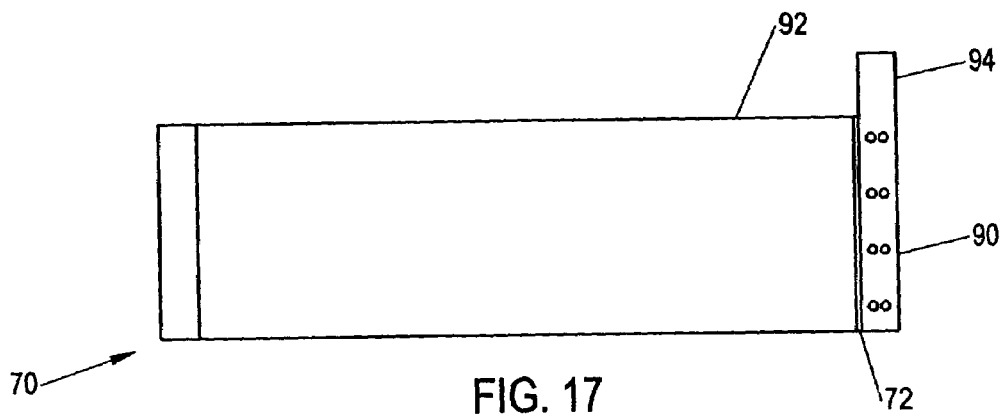
FIG. 17 is a plan view of the negative electrode strip showing the attachment of a flexible electrically conductive tab to the bared outer end of the negative electrode substrate.

FIG. 15 depicts a preferred configuration of the outer end 83 of the negative electrode strip 70. Note that the outer end 88 of the substrate 72 is bared on both its top and bottom faces. Additionally, as shown in FIG. 17, a flexible metal tab 90 is welded crosswise to the substrate 72 so as to extend beyond edge 92. More particularly, note that portion 94 of tab 90 is cantilevered beyond edge 92 of negative electrode strip 70. This tab portion, as will be described hereinafter, is utilized to mechanically and electrically connect to an endcap for closing a battery case.

Figure 18:
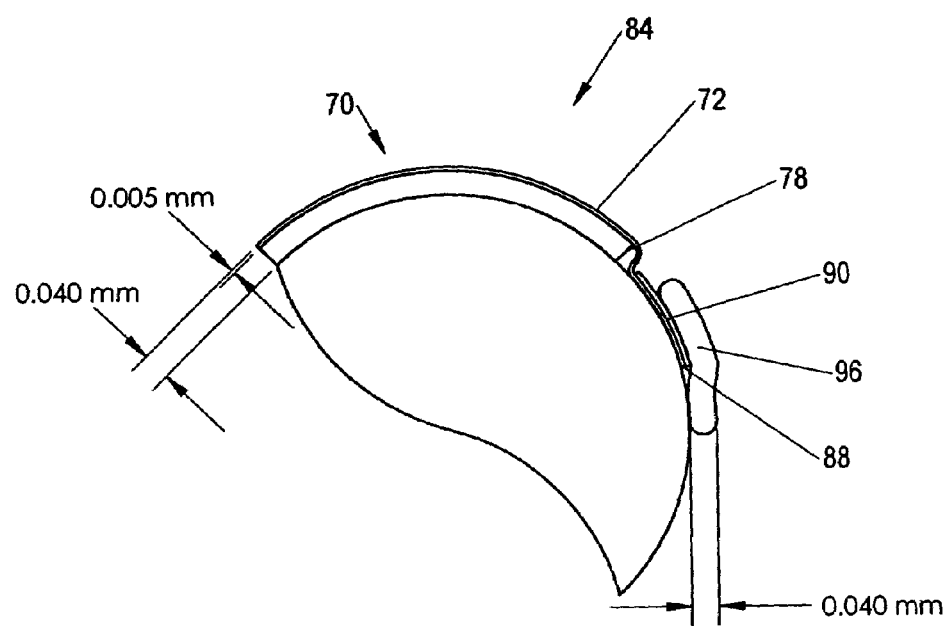
FIG. 18 is an enlarged sectional view showing how the outer turn of the negative electrode strip is taped to the next inner layer to close the jellyroll to minimize its outer radius dimension.

Attention is now called to FIG. 18, which illustrates a preferred technique for closing the jellyroll assembly 84. That is, the bared end 88 of the negative electrode substrate 72 extending beyond the negative active material coat 78 is draped over the next inner layer of the jellyroll assembly 84. The end 88 can then be secured to the next inner layer, e.g., by appropriate adhesive tape 96. One such suitable adhesive tape is DuPont Kapton® polyimide tape. It is important to note that the outer end configuration 88 of the negative electrode strip 70 enables the outer radius dimension of the jellyroll assembly 84 to be minimized as shown in FIG. 18. More particularly, by baring the substrate 72 beyond the active material 78, the tape 96 is able to secure the substrate end without adding any radial dimension to the jellyroll assembly. In other words, if the outer end of the substrate were not sufficiently bared, then the tape 96 would need to extend over the active material and thus add to the outer radius dimension of the jellyroll 84. Furthermore, the bare substrate 72 is more flexible than the substrate coated with active material 78 and conforms more readily to the jellyroll assembly 84, making it easier to adhere it to the surface of the jellyroll. These space savings, although seemingly small, can be clinically important in certain medical applications. It should be noted that the electrode need only be bared at an end portion long enough to accommodate the tape 96, as shown in FIG. 18. Because the uncoated substrate does not function as an electrode, it would waste space in the battery to bare any more than necessary to accommodate the tape. In a preferred embodiment, the length of uncoated substrate is between 1 and 8 mm, and more preferably about 2 mm.

Figure 19:
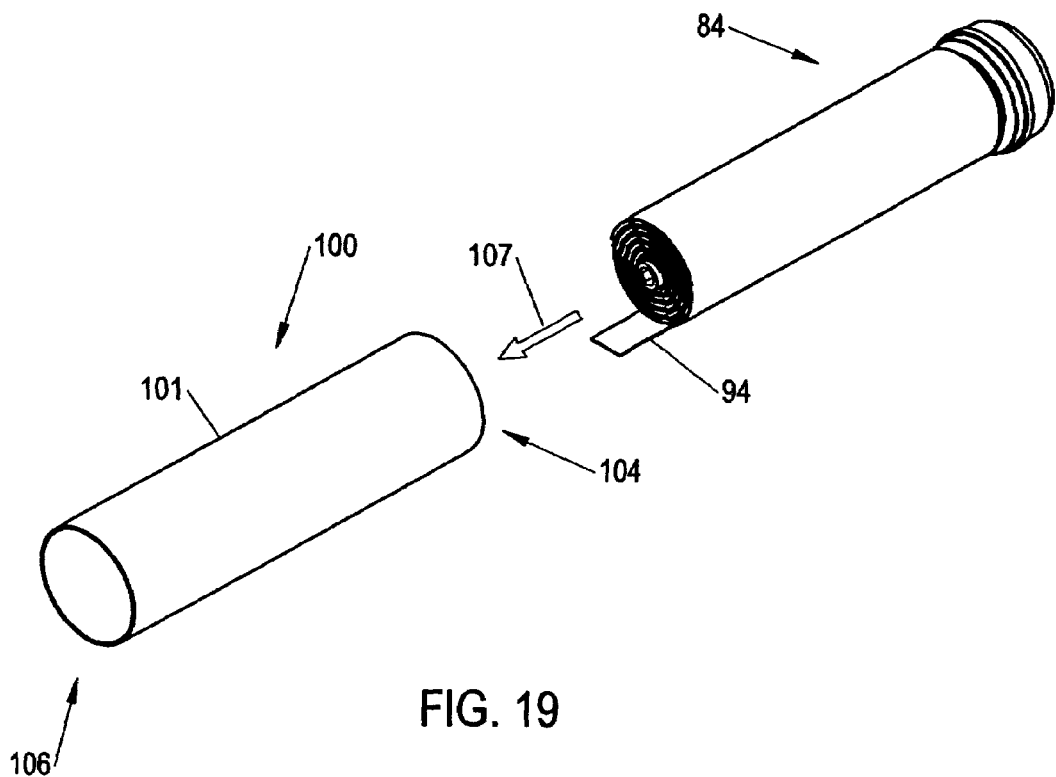
FIG. 19 is an isometric view depicting the jellyroll electrode assembly being inserted into a cylindrical battery case body.
Figure 20:
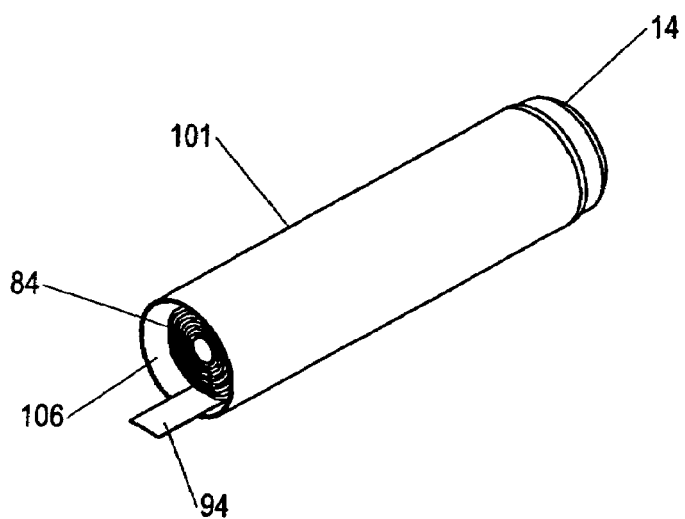
FIG. 20 is an isometric view showing a battery case body with the negative electrode tab extending from the open case body.
Figure 21:
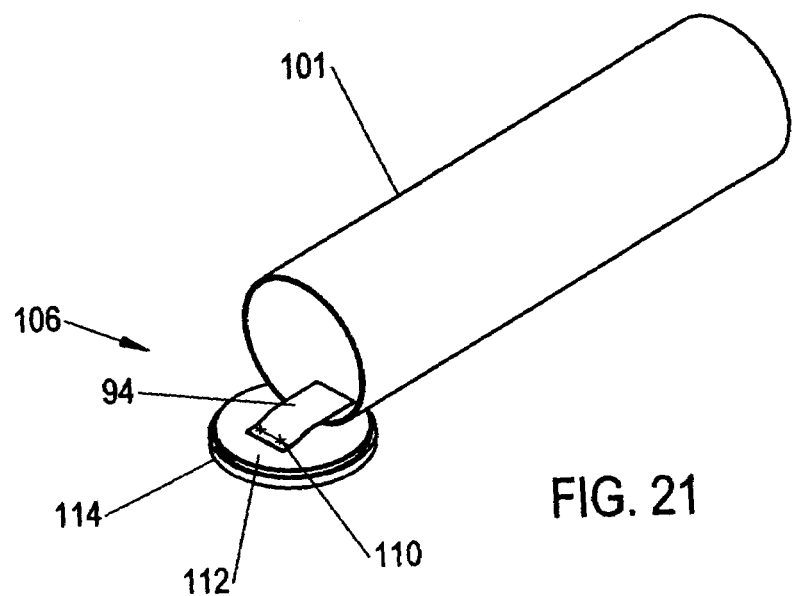
FIG. 21 is an isometric view showing how the negative electrode tab is mechanically and electrically connected to an endcap for sealing the case body second end.

FIG. 19 depicts the completed jellyroll assembly 84 and shows the cantilevered tab portion 94 prior to insertion into a battery case body 100. The case body 100 is depicted as comprising a cylindrical metal tube 101 having an open first end 104 and open second end 106. Arrow 107 represents how the jellyroll assembly 84 is inserted into the cylindrical tube 101. FIG. 20 depicts the jellyroll assembly 84 within the tube 101 with the cantilevered negative electrode tab 94 extending from the case open second end 106. The case open first end 104 is closed by the aforementioned header 14 of the pin subassembly 10 shown in FIGS. 1 and 2. More particularly, note that the metal hollow member 22 is configured to define a reduced diameter portion 108 and shoulder 110. The reduced diameter portion 108 is dimensioned to fit into the open end 104 of the cylindrical tube 101 essentially contiguous with the tube's inner wall surface. The shoulder 110 of the hollow member 22 engages the end of the case tube 101. This enables the surfaces of the reduced diameter portion 108 and shoulder 110 to be laser welded to the end of the case 100 to achieve a hermetic seal.

Figure 22:
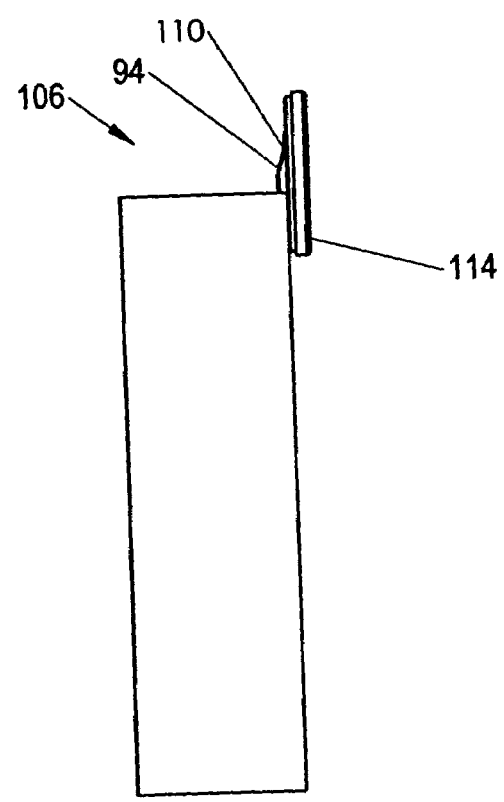
FIG. 22 is a side view showing how the negative electrode tab holds the second endcap proximate to the case body second end without obstructing the open second end.
Figure 23:
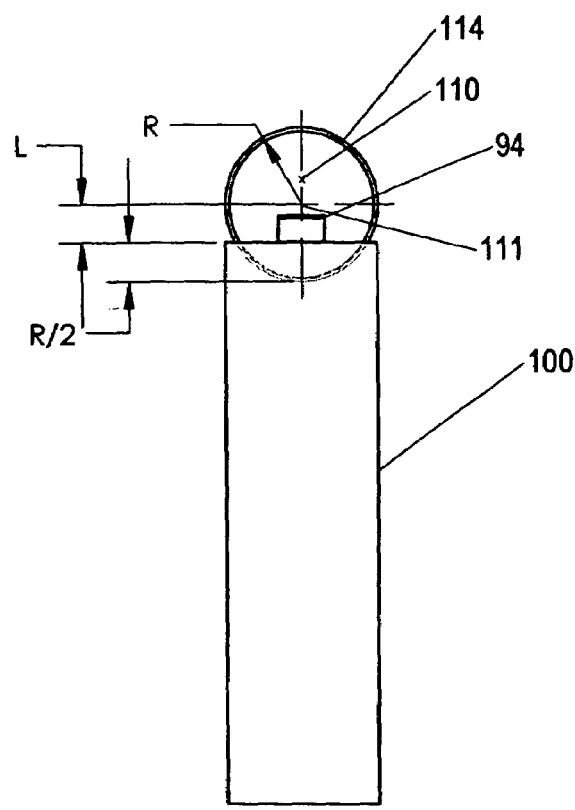
FIG. 23 is a front view showing the weld position and the relationship between the various components.

Attention is now directed to FIGS. 21-24, which depict the tab 94 extending from the second open end 106 of the case tube 101. Note that the tab 94 extends longitudinally from the body close to the case tube adjacent to tube's inner wall surface. In accordance with a preferred embodiment of the invention, the tab 94 is welded at 110 to the inner face 112 of a circular second endcap 114. In accordance with a preferred embodiment, the tab 94 is sufficiently long to locate the weld 110 beyond the center point of the circular endcap 114. More particularly, note in FIGS. 21-24 that by locating the weld 110 displaced from the center of the cap 114, the tab 94 can conveniently support the endcap 114 in a vertical orientation as depicted in FIG. 22 misaligned with respect to the open end 106. This end cap position approximately perpendicular to the end 122 of the case 100 is a first bias position wherein the end cap advantageously tends to remain in that orientation with the case end open prior to filling. To further describe the relationship between the weld location and the various components, FIG. 23 shows a front view with various dimensions. L represents the length from the weld 110 to the top of the case 100 as measured parallel to the edge of the case. R is the radius of the end cap 114. For the preferred geometry, $L \leq 2R$. Weld 110 is preferably made above the center point 111 of the end cap 114. Preferably, the end cap 114 overlaps the case 100 by approximately R/2. By configuring the tab 94 and weld 110 as indicated, the endcap 114 can be supported so that it does not obstruct the open end 106, thereby facilitating electrolyte filling of the case interior cavity via open end 106. A filling needle or nozzle can be placed through open end 106 to fill the case. This obviates the need for a separate electrolyte fill port, thereby reducing the number of components and number of seals to be made, thus reducing cost and improving reliability. Furthermore, for small medical batteries, the end caps would be very small to have fill ports therein. In a preferred embodiment in which the case wall is very thin, for example, 0.002 inches, providing a fill port in the side wall of the case would be impractical. Even in the case of larger devices where space is less critical and the wall is more substantial, providing a fill port in the side of the case would mean the electrolyte would have a very long path length to wet the jellyroll. Note that while the case could be filled with electrolyte prior to welding tab 94 to endcap 114, it would be difficult and messy to do so. Therefore, it is advantageous to configure the tab 94 and weld 110 as described to allow the weld to be made prior to filling.

Preferably before filling, a bottomside electrode insulator (not shown), which may comprise a thin disk of DuPont Kapton® polyimide film, is installed into the case between the rolled electrode assembly and the still open end of the battery case.

In a preferred filing method, there is a channel of air between the pin and the crimped or welded C-shaped mandrel, which is used as a conduit for quickly delivering the electrolyte to the far end of the battery and to the inside edges of the electrodes within the jellyroll. Filling from the far end of the battery prevents pockets of air from being trapped, which could form a barrier to further filling. This facilitates and speeds the filling process, ensuring that electrolyte wets the entire battery.

Figure 24:
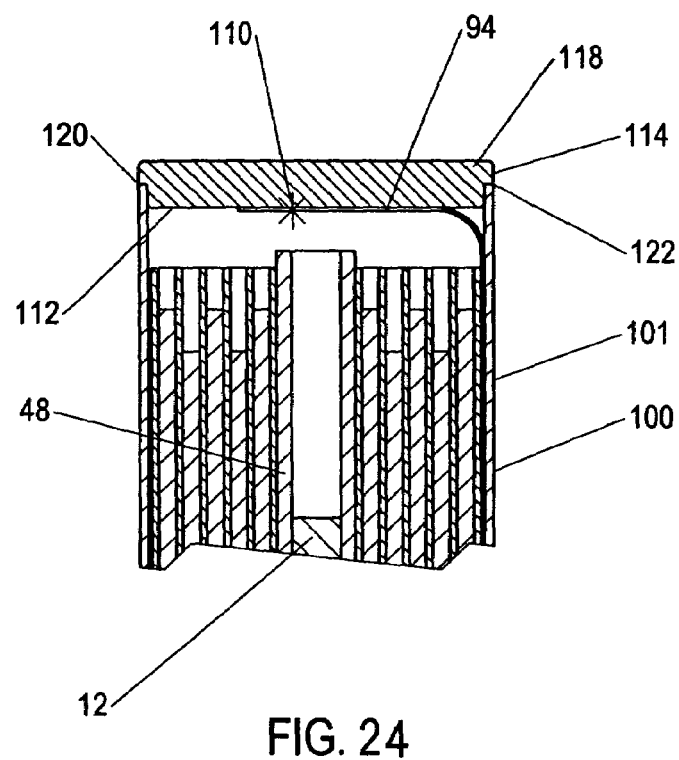
FIG. 24 is an enlarged sectional view of the second end of the battery case showing the endcap in sealed position.

Thereafter, the flexible tab 94 can be bent to the configuration depicted in FIG. 24. Note that the endcap 114 is configured similarly to header hollow member 22 and includes a reduced diameter portion 118 and a shoulder 120. The reduced diameter portion snugly fits against the inner surface of the wall of tube 101 with the endcap shoulder 120 bearing against the end 122 of the cylindrical case 100. The relatively long length of the tab 94 extending beyond the center point of the endcap surface 112 minimizes any axial force which might be exerted by the tab portion 94 tending to longitudinally displace the endcap 114. The end cap position covering the end 122 of the case 100 is a second bias position wherein the end cap advantageously tends to remain in that orientation prior to welding. With the endcap in place, it can then be readily welded to the case wall 101 to hermetically seal the battery. With tab 94 welded to negative substrate 72 and with the negative electrode strip 70 as the outermost layer of the jellyroll, the endcap 114 becomes negative. In turn, welding the endcap 114 to the case 100 renders the case negative.

From the foregoing, it should now be appreciated that an electric storage battery construction and method of manufacture have been described herein particularly suited for manufacturing very small, highly reliable batteries suitable for use in implantable medical devices. Although a particular preferred embodiment has been described herein and exemplary dimensions have been mentioned, it should be understood that many variations and modifications may occur to those skilled in the art falling within the spirit of the invention and the intended scope of the appended claims.

We claim:

1. A method of forming a battery, comprising:
    arranging battery components such that
        an electrode is in electrical communication with a pin,
        an electrode is electrically insulated from the pin,
        a tab provides electrical communication between an end cap and the electrode that is electrically isolated from the pin,
        the electrodes are positioned in a case and are wound around the pin, and
        the end cap is configured to close an opening in the case;
    transporting electrolyte through the opening and into the case while resting the end cap on the case with an edge of the case between a portion of the tab and a portion of the end cap and the tab extends from the electrodes in the case over an edge of the case, the edge defining the opening; and
    sealing the opening with the end cap.

2. The method of claim 1, wherein the tab is connected to the end cap such that resting the end cap on the case holds the end cap in an orientation that is substantially perpendicular to the opening.

3. The method of claim 1, wherein a weld connects a flat portion of the tab to an inner face of the end cap.

4. The method of claim 1, wherein:
    the end cap has a radius; and
    the opening is sealed with the cap such that the tab is positioned adjacent to the end cap without being connected to the end cap for a distance that is greater than the radius.

5. The method of claim 1, wherein the tab is connected to a connection location on the end cap and the end cap is rested on the case such that the connection location is above a center point on the end cap.

6. The method of claim 1, wherein:
    the end cap has a radius; and
    the end cap is rested on the case such the end cap overlaps the case by at least an amount that exceeds the radius.

7. The method of claim 1, wherein the opening is sealed with the end cap such that the tab extends from a first location adjacent to the case past a center point of the end cap to a second location where the tab is electrically connected to the end cap.

8. The method of claim 7, wherein the tab is not connected to the end cap continuously over a distance extending from the first location to the second location.

9. The method of claim 1, wherein the electrodes are electrode strips wound around the pin so as to form a spiral role on the pin.

10. The method of claim 9, wherein the spiral role includes at least one separator separating the electrodes.

11. The method of claim 1, wherein a mandrel is mounted on the pin such that the electrodes are wound around the pin and the mandrel.

12. The method of claim 11, wherein the mandrel includes a longitudinal slot; and wherein
one of the electrodes is in electrical communication with the pin and also extends through the mandrel slot.

13. The method of claim 11, wherein the electrodes in electrical communication with the pin includes a region that is positioned between the mandrel and the pin.

14. The method of claim 11, wherein the electrodes in electrical communication with the pin includes active material positioned on a substrate, the substrate is positioned between the mandrel and the pin without the active material being positioned between the mandrel and the pin.

15. The method of claim 11, wherein the mandrel is crimped onto the pin.

16. The method of claim 15, wherein the pin is positioned in an interior of the tube.

17. The method of claim 11, wherein a weld attaches the mandrel to the pin.

18. The method of claim 11, wherein the mandrel includes titanium or an alloy of titanium.

19. The method of claim 11, wherein the mandrel includes a tube.

20. The method of claim 11, wherein the mandrel has a c-shaped cross-section.

21. The method of claim 11, wherein the mandrel is fitted around the pin such that the electrodes are wound around the pin and the mandrel.

22. The method of claim 11, wherein the mandrel is a reinforcing mandrel.

23. The method of claim 1, wherein at least one weld directly connects the pin the electrode in electrical communication with the pin.

24. The method of claim 1, wherein the pin includes of a PtIr alloy.

25. The method of claim 1, wherein the end cap includes an electrical insulator,
the pin extends through the electrical insulator, and
the pin is hermetically sealed to the electrical insulator.

26. The method of claim 1, wherein the case is electrically conducting.

27. The method of claim 1, wherein the end cap is rested on the case such that the tab extends over a portion of the edge that is between the end cap and the portion of the tab.

28. The method of claim 1, wherein the end cap is rested on the case such that the tab terminates above the edge.

29. The method of claim 1, wherein the tab does not extend from over the edge to a location between the case and the end cap.

* * * * *